United States Patent
Roethler et al.

(10) Patent No.: US 7,238,139 B2
(45) Date of Patent: Jul. 3, 2007

(54) ELECTRIC AND HYBRID ELECTRIC POWERTRAIN FOR MOTOR VEHICLES

(75) Inventors: Bob Roethler, Howell, MI (US); Michael Berhan, Sylvania, OH (US)

(73) Assignee: Ford Global Technologies, Inc., Dearborn, MI (US)

(*) Notice: Subject to any disclaimer, the term of this patent is extended or adjusted under 35 U.S.C. 154(b) by 176 days.

(21) Appl. No.: 11/169,192

(22) Filed: Jun. 28, 2005

(65) Prior Publication Data

US 2006/0148609 A1    Jul. 6, 2006

Related U.S. Application Data

(63) Continuation-in-part of application No. 11/030,237, filed on Jan. 6, 2005.

(60) Provisional application No. 60/655,114, filed on Feb. 22, 2005.

(51) Int. Cl.
*F16H 37/02* (2006.01)
(52) U.S. Cl. .................................................. 475/216
(58) Field of Classification Search ............. 475/216, 475/217, 13
See application file for complete search history.

(56) References Cited

U.S. PATENT DOCUMENTS

| 6,053,841 | A  |   | 4/2000  | Koide et al.   |         |
|-----------|----|---|---------|----------------|---------|
| 6,302,819 | B1 | * | 10/2001 | Yamada et al.  | 475/214 |
| 6,561,941 | B2 | * | 5/2003  | Nakano et al.  | 475/214 |
| 6,949,045 | B2 | * | 9/2005  | Wafzig et al.  | 475/216 |
| 6,979,276 | B2 | * | 12/2005 | Murray         | 475/216 |

* cited by examiner

*Primary Examiner*—Dirk Wright
(74) *Attorney, Agent, or Firm*—David B. Kelley; MacMillan, Sohavski & Todd, LLC

(57) ABSTRACT

A powertrain for transmitting power to a driven wheel of a motor vehicle includes a power source that includes a reversible electric machine. A first transmission includes an input driveably connected to the power source, a first output, and a mechanism for producing a stepless variable range of ratios of a speed of the output to a speed of the input. An epicyclic transmission includes a second input driveably connected to the power source, a third input driveably connected to the first output, and a second output driveably connected to a drive wheel. The transmissions produce a range of speed of the drive wheel that varies from negative to positive and includes zero.

25 Claims, 4 Drawing Sheets

ELECTRIC AND HYBRID ELECTRIC POWERTRAIN FOR MOTOR VEHICLES

CROSS-REFERENCE TO RELATED APPLICATIONS

This application is a continuation-in-part of pending U.S. application Ser. No. 11/030,237, filed Jan. 6, 2005. This application claims the benefit of U.S. Provisional Application No. 60/655,114, filed Feb. 22, 2005.

BACKGROUND OF THE INVENTION

This invention relates generally to hybrid powertrains for motor vehicles having two power sources or prime movers, such as an electric motor and internal combustion engine. In particular, the invention pertains to a powertrain that provides the driver with an acceptable response to a command for a change in wheel torque even though the prime mover is slow to respond to the command.

Hybrid electric powertrains for motor vehicles include at least two power sources or prime movers, an electric motor or motor/generator, accessible to an electric storage unit such as a battery, and an engine, such as an internal combustion engine supplied from a fuel source. Powertrains for another type of motor vehicle, electric drive, include one power source, an electric motor or motor/generator supplied from an electric storage battery.

The electric machine systems for either type of powertrain may use a battery, flywheel, capacitor, fuel cell, or other energy storage devices. The engines in hybrid powertrains may be gasoline, diesel, or other fuel-based combustion systems.

The rotational speed and torque states of a hybrid electric powertrain having either a step ratio transmission or fixed-span continuously variable transmission cannot be transiently isolated from the speed and torque states of the driveline and wheels demanded by the operator. This lack of isolation imposes constraints on the efficient use of hybrid electric, kinetic energy storage systems.

Certain types of internal combustion engines and fuel cell systems can provide high efficiency and low emissions, but with relatively slow transient load and speed response. This slow transient response is unacceptable for vehicles with conventional drivelines.

Certain types of transmissions provide acceptable vehicle transient response even when used in combination with slow transient response engines. The basic features of these transmissions include an infinitely variable drive ratio, and reversible torque machines with energy storage. An infinitely variable transmission (IVT) is a transmission that produces an infinite speed ratio span and continuous speed ratio variation.

Internal combustion engine development has been concentrated on efficient power sources such as engines and combustion systems that produce low exhaust gas emissions. Gasoline engines that use homogeneous charge compression ignition (HCCI) combustion show potential to operate as efficiently as a diesel engine, yet emit a very low volume of NOx compounds in the exhaust gas. However, on a fixed compression ratio basis, a HCCI combustion system is five to ten times slower in response to load changes than a stoichiometric, port fuel injected, spark ignited combustion system, the current production baseline engine.

Slow dynamic engine response requires both speed isolation and load isolation to produce acceptable performance. The key powertrains for producing speed and load isolation include series electric, series hybrid, power-split electric and power-split hydraulic. The prime mover would be suitably decoupled from the drive wheels, as in most conventional high power hybrid powertrains.

An energy storage media onboard the vehicle supplements energy derived from engine fuel. The energy storage media must be capable of powering the vehicle for the length of the period while the prime mover is adjusting to the new load state, generally about one to five seconds. Both hydraulic and electric hybrid architectures may be used to provide the auxiliary energy storage.

Energy stored in hydraulic fluid accumulators, electric batteries, capacitors, or flywheels can be used in combination with reversible machines, such as hydraulic pump/motors and electric motors, to accelerate the vehicle in response to the driver's demand for increased wheel torque, while the prime mover is moving from an idle state to a full load state. The stored energy reserve can be recovered from regenerative wheel braking or it can be produced by the prime mover while road load is low.

There is a need to provide a powertrain having components that compensate for the inherently slow dynamic response of a prime mover such as an IC engine or other power source to provide the operator with an acceptable, timely response to speed and load transient demands.

SUMMARY OF THE INVENTION

In hybrid powertrains, an energy storage device is controlled and managed such that fuel use is minimized. Generally, hybrid electric vehicle powertrains are designed with battery systems that have power capacity significantly less than that of the prime mover's maximum power rating. The battery is compromised in this way because the cost and mass of a battery that would achieve both high power and a small state of charge excursion, a requirement for satisfactory service life, is too great.

An advantage of the control produced by this invention is augmenting the power output produced by prime mover, thereby producing a higher average load factor and high efficiency and allowing use of a smaller than normal prime mover in the powertrain.

Another advantage of this invention is the ability to use an efficient, clean combustion system having slow load response as the prime mover in a vehicle having excellent dynamic response. To accomplish this advantage a powertrain according to this invention uses an infinitely variable transmission and an energy storage device specifically to isolate the engine from vehicle transient speed and load demands. The powertrain can use a brake-by-wire regenerative braking system that prioritizes deceleration torque first from the transmission and second from the friction wheel brakes. The regenerative braking system is compatible with anti-lock braking, traction control and vehicle dynamic safety systems.

The powertrain is compatible with two-wheel and four-wheel drive operation. All-wheel-drive operation can be accomplished with a transfer case and mechanical link to a second set of wheels. Alternately, all-wheel-drive operation can be accomplished with an additional reversible machine, compatible with the transmission reversible machine, on the other set of wheels. This can provide additional kinetic energy recovery as well as maximum acceleration and wheel traction on a road surface with a low coefficient of friction.

The transmission can be used with a compression ignition (CI) engine, such as a diesel engine. Particulate emissions can be reduced because slow transient load response is accommodated with the transmission. A lower cost turbocharger can be used since fast transient load response is not required from the engine.

A powertrain according to this invention for transmitting power to a drive wheel of a motor vehicle includes a power source, preferably an electric motor/generator, sometimes referred to as a reversible electric machine. A first transmission includes an input driveably connected to the power source, a first output, and a mechanism for producing a stepless variable range of ratios of a speed of the output to a speed of the input. An epicyclic transmission includes a second input driveably connected to the power source, a third input driveably connected to the first output, and a second output driveably connected to a drive wheel. The transmissions produce a range of speed of the drive wheel that varies from negative to positive and includes zero.

The powertrain transiently isolates both the speed and torque states of the prime mover from the speed and torque states of the drive wheels as demanded by the operator. The powertrain improves various performance characteristics when using only an electric machine to accelerate the vehicle from a stopped condition, called vehicle launch, including torque and power requirements, stall constraints, regenerative braking throughput efficiency, range of powertrain scheduling authority, and the speed of powertrain and vehicle response to driver commands. Further, the powertrain facilitates running the electric machine at maximum efficiency. The powertrain requires no slipping clutch, brake, or torque converter to launch the vehicle, or any other energy-dissipating disconnect or isolation device between the electric machine and the transmission.

The powertrain is best implemented with a torque controlled infinitely variable transmission (IVT) and a power-split epicyclic transmission that can operate in a geared-neutral state. An infinitely variable transmission produces a wide range of ratios of the speed of its input to that of its output without producing discrete step-changes among the speed ratios. A geared-neutral state is an operating condition in which at least two input elements of the epicyclic transmission are driven, no element of the transmission is held against rotation, and an output element does not rotate. Furthermore, the output element of the epicyclic transmission can be driven through stepless forward speed and a reverse speed ranges.

Due to the geared-neutral state, the electric machine can be directly coupled to the IVT input, yet be isolated from the IVT output and the drive wheels of the vehicle. This allows an electric machine alone to launch the vehicle at a higher efficiency operating point of the electric machine, rather than from a zero-speed, lower efficiency electric machine point: An electric machine, when decoupled from the vehicle or both the vehicle and the engine, can accelerate to its maximum efficiency point very quickly. After that speed is attained, the IVT can rapidly change to its desired output ratio, i.e., the driver demanded wheel power. Power saved by this efficient use of the motor is available to launch more efficiently the vehicle rapidly and smoothly. The large torque multiplication possible with an IVT also allows use of an electric machine having smaller torque and electric current capacity for the same power delivered to the drive wheels. A smaller electric machine can reduce cost of the system.

Additionally, a torque controlled IVT that isolates the electric machine and engine from the vehicle, more easily facilitates smooth engine restart after vehicle launch using the electric motor only. The higher efficiency and better operating point control of such a system also facilitates higher efficiency in recovering kinetic energy during regenerative braking down to zero vehicle speed. This reduces the need to dissipate kinetic energy in the vehicle's wheel brakes.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
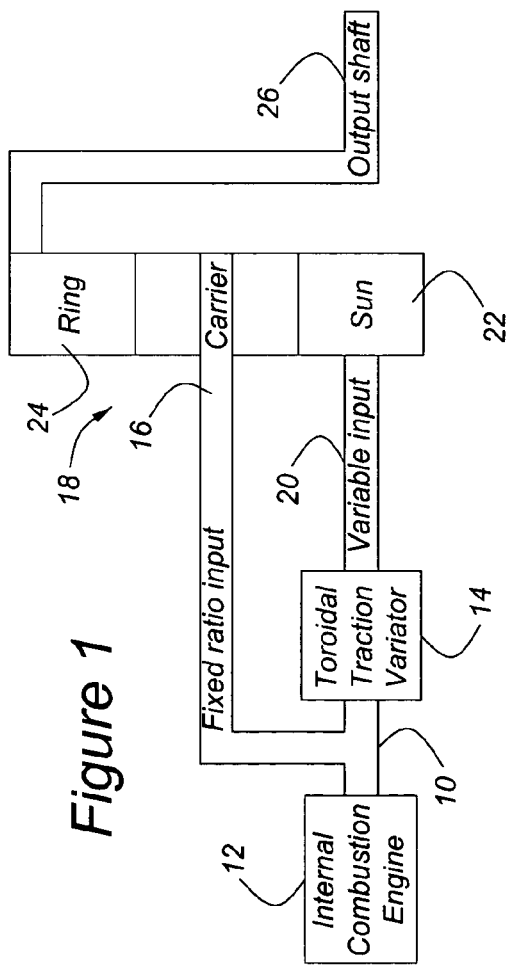
FIG. 1 is a schematic diagram of a fully mechanical traction drive IVT powertrain for a motor vehicle.

Referring first to FIG. 1, the output 10 of a prime mover 12, such as an internal combustion (IC) engine, is drivably connected to the input of a toroidal traction drive transmission 14 and to the planet pinion carrier 16 of an epicyclic transmission 18. The planet pinions supported on carrier 16 are in continuous meshing engagement with a sun gear 22 and ring gear 24 of the epicyclic transmission 18. The output 20 of the traction drive transmission 14 is driveably connected to the sun gear 22. The ring gear 24 of transmission 18 is driveably connected to an output shaft 26, to which a drive wheel of a motor vehicle is driveably connected.

To best apply the advantages of this invention, the prime mover 12 would be characterized by slow load and speed response and preferably would include any of the following group: a homogeneous charge compression ignition (HCCI) gasoline ICE, HCCI diesel ICE, and turbocharged diesel ICE. Less preferred alternatives include a Stirling engine, a fuel cell stack in combination with a series electric transmission, i.e., an electric generator driven by an ICE, and an electric motor driven by a generator and driveably connected to the driven wheels.

All of these prime movers have slow transient response. Throughout this discussion the term "slow response" means a period for the prime mover to respond to a command for a change in torque that is generally too slow for use in a conventional on-road application, i.e., a prime mover that requires more than 1-2 seconds response time to pass from the prime mover idling with no commanded wheel torque to the prime mover producing full torque, but not necessarily full power.

Figure 2:
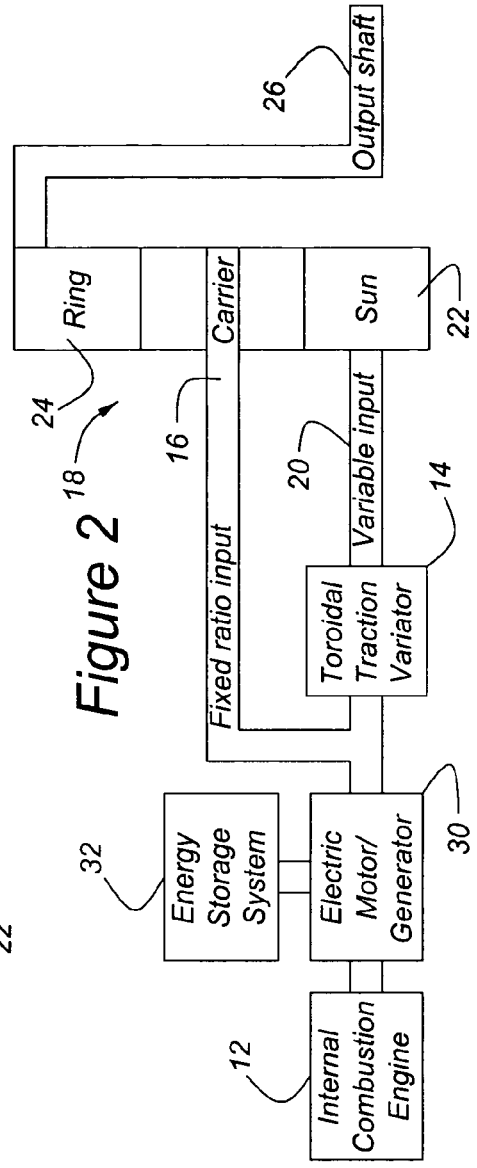
FIG. 2 is a schematic diagram of a hybrid electric motor vehicle powertrain that includes an IVT and a motor/generator.

FIG. 2 is a schematic diagram of a hybrid electric vehicle powertrain that includes an IC engine 12 and electric motor/generator 30. The output of the engine 12 is driveably connected to the input of a toroidal traction drive transmission 14 and to the planet pinion carrier 16 of an epicyclic transmission 18. The planet pinions supported on carrier 16 are in continuous meshing engagement with a sun gear 22 and ring gear 24 of the epicyclic transmission 18. The output of the electric motor/generator 30 is supplied with electric power from an electric energy storage device, such as an electric storage battery 32. The output 20 of the traction drive transmission 14 is driveably connected to the sun gear 22. The ring gear 24 of transmission 18 is driveably connected to an output shaft 26, to which a drive wheel of a motor vehicle is driveably connected.

Figure 3:
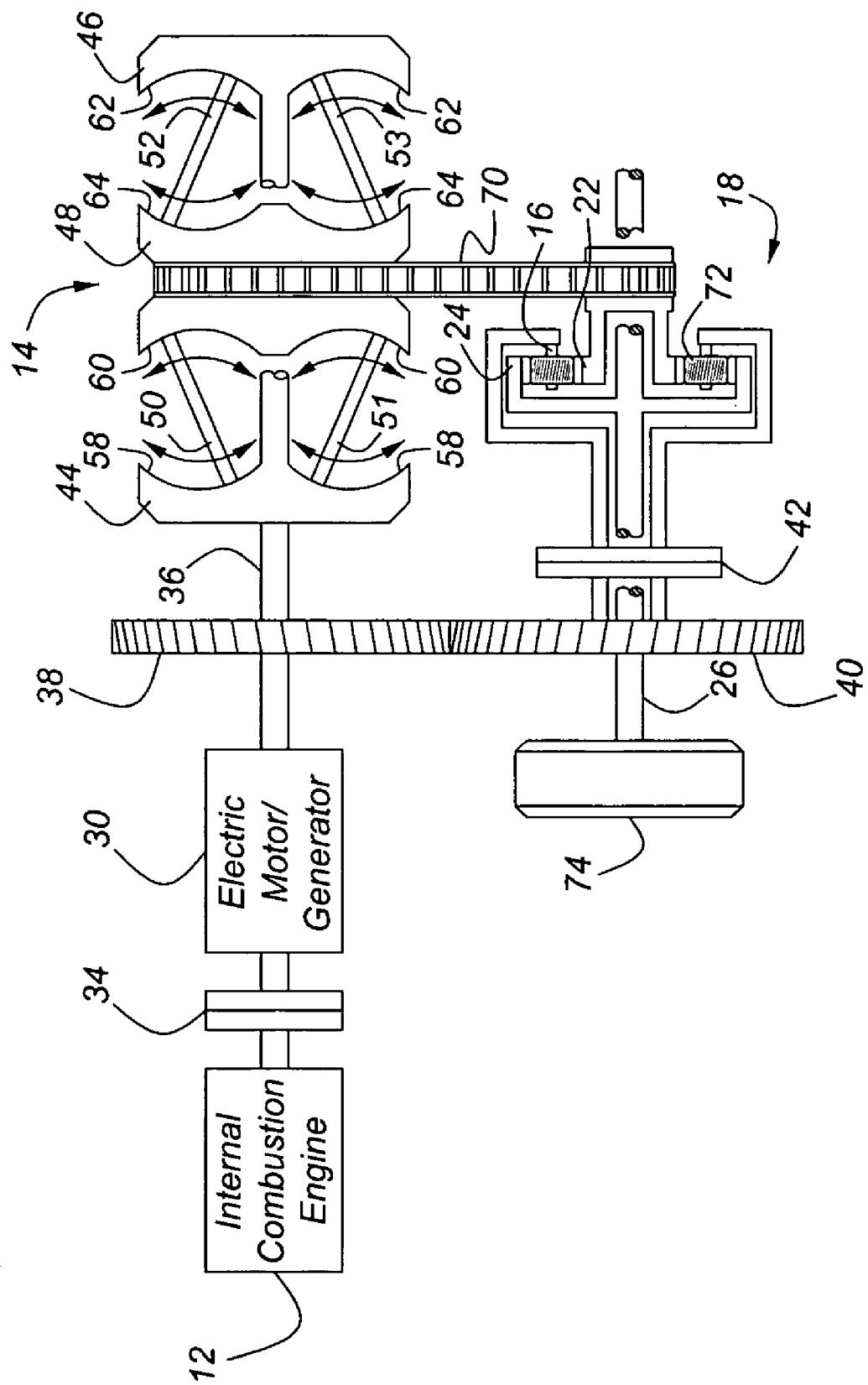
FIG. 3 is a schematic diagram of a hybrid electric motor vehicle powertrain that includes a traction drive IVT, motor/generator, and engine disconnect clutch located between an engine and the motor/generator.

FIG. 3 is a schematic diagram of hybrid electric vehicle power train that includes an engine disconnect device 34, such as a friction clutch located in a drive path between the engine 12 and an electric motor/generator 30, sometimes referred to as a reversible electric machine. The output 36 of the motor 30 is driveably connected through a layshaft gear pair, which includes a pinion 38 secured to shaft 36 and a gear 40 in meshing engagement with pinion 38 and secured to the carrier 16 of the epicyclic transmission 18 through a clutch 42. When clutch 42 is engaged, the power sources 12, 30 are driveably connected to pinion carrier 16; when clutch 42 is disengaged, carrier 16 is driveably disconnected from the power sources. The motor/generator 30 preferably is secured to the IVT 18 and is releasably connected to the engine 12.

The toroidal traction drive IVT 14 includes two axially-spaced input discs 44, 46 driveably connected to shaft 36, an output disc 48, and rollers 50-53. An inner surface of input disc 44 is formed with engagement surfaces 58, and the inner surface of output disc 48 is formed with engagement surfaces 60, which face surfaces 58. Similarly the axial inner surface of input disc 46 is formed with engagement surfaces 62, and the other inner surface of output disc 48 is formed with second engagement surfaces 64, which face surface 62. The rollers 50, 51 can pivot clockwise and counterclockwise from the position shown in FIG. 3 while maintaining contact with the engagement surfaces 58, 60. Similarly, rollers 52, 53 can pivot from the position shown in FIG. 3 in both angular directions, clockwise and counterclockwise, while maintaining contact with engagement surfaces 62, 64.

When rollers 50, 53 pivot clockwise and rollers 51, 52 pivot counterclockwise, the speed of output disc 48 is faster than the speed of the input discs 44, 46. Conversely when rollers 50, 53 pivot counterclockwise and rollers 51, 52 pivot clockwise, the speed of output disc 48 is slower than the speed of input discs 44, 46. The outer surface of output disc 48 is formed with a sprocket surface, engaged by a drive chain 70, which transmits power at a fixed speed ratio to the sun gear 22 of the epicyclic transmission 18. A sprocket wheel, secured to sun gear 22, engages drive chain 70, forming a torque path between the output of transmission 14 and sun gear 22.

The epicyclic transmission 18 includes a ring gear 24, which is aligned axially with sun gear 22, and a set of planet pinions 72, which is supported on carrier 16. The output shaft 26, secured to ring gear 24, and is driveably to a driven wheel 74 of the motor vehicle. Preferably the output 26 is driveably to both right hand and left hand drive wheels through an intermediate differential mechanism.

Transmissions 14 and 18 cooperatively produce a geared-neutral output at the road wheel 74 by controlling the speed of the output disc 48 in relation to the speed of the input shaft 36 and planet carrier 16. For example, if the speed of output disc 48 and sun gear 22 is faster than the rotational speed of carrier 46, the output 26 will be negative, or in the opposite direction from the direction of rotation of output disc 48. If the speed of output disc 48 is equal to the speed of carrier 16, then the speed of output 26 is equal to and in the same direction as that of the output disc 48. If the speed of output disc 48 and sun gear 22 is less than speed of carrier 16, then the output shaft 26 is overdriven, i.e., its speed is greater than the speed of carrier 16. If the speed of output disc 48 and sun gear 22 is equal to the speed of carrier 16 plus a predetermined constant, then the speed of output 26 is zero and the powertrain operates in a geared-neutral condition. The constant that produces geared-neutral operation in the epicyclic transmission 18 is unity plus the ratio of the diameter of ring gear 24 and the diameter sun gear 22.

Figure 4:
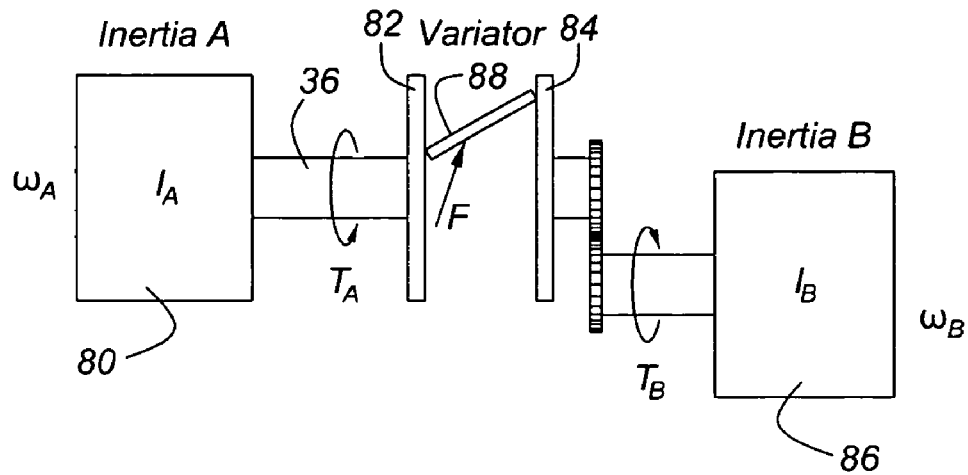
FIG. 4 is a schematic diagram of a torque controlled traction drive IVT.

Preferably the traction drive transmission 14 is a torque controlled device of the type illustrated in FIG. 4. Drum 80 represents the rotational inertia of the power sources and clutch 34, which are driven by input torque TA. The input shaft 36 is secured to an input disc 82. The output disc 84 is connected to a drum 86, representing the rotating inertia of the powertrain between the IVT 14 and the road wheel 74. The angular position of roller 88 is determined by the magnitude of force F that is applied to the roller. In this way, the magnitude of the output torque TB is determined by the magnitude of the force F.

Figure 5:
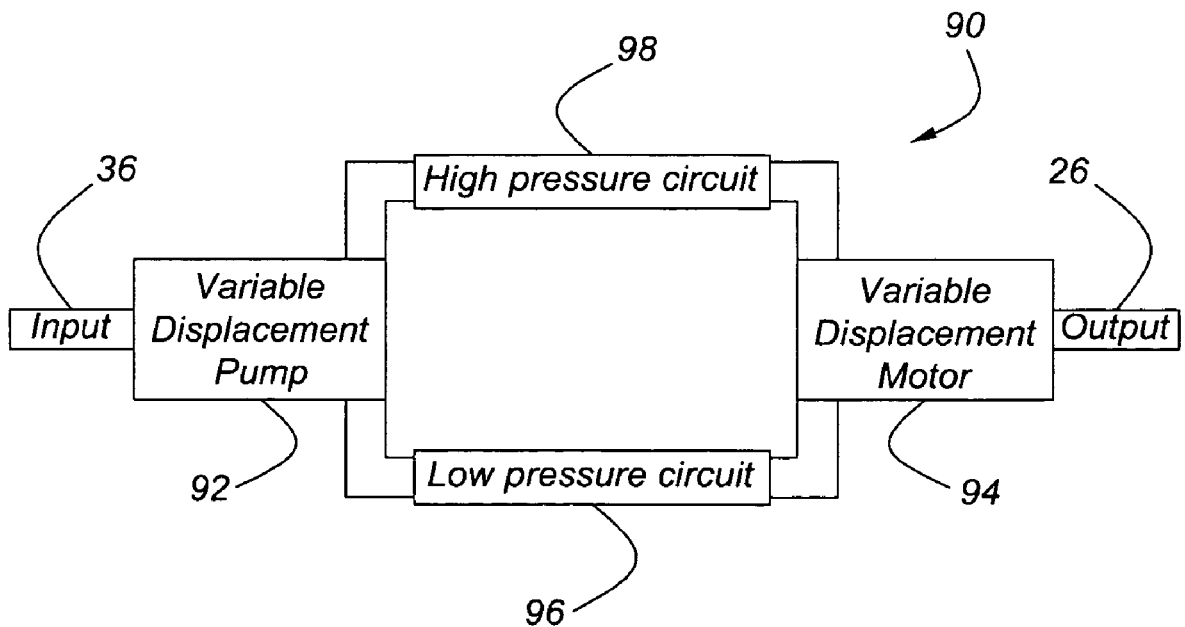
FIG. 5 is a schematic diagram of a hydrostatic transmission whose pump and motor have variable displacement.

FIG. 5 is a schematic diagram of a hydrostatic transmission 90, which may be substituted for the IVT 14. Transmission 90 includes a hydraulic pump 92, driveably connected to the input 36, and a hydraulic motor 94, driveably connected to the output 26. Both the pump 92 and motor 94 have variable displacement. The pump 92 communicates with a low pressure circuit 96, from which fluid is pumped to a high pressure circuit 98. The motor 94, driven by fluid from circuit 98, communicates with the low pressure circuit 96, to which fluid returns from the motor.

When displacement of the pump 92 is zero and the power source is running, the drive wheel 74 of the vehicle is not driven because the output 36 is locked. When displacement of the motor 94 is zero, the input 36 is locked, the output 26 is free to rotate, and a clutch is required in the drive path between the engine and the pump 94 if the engine is to run with the drive wheel 74 stopped. When displacement of the pump 92 reaches its maximum, displacement of the pump 92 can be reduced, thereby overdriving the output 26 relative to the speed of the input 36.

Figure 6:
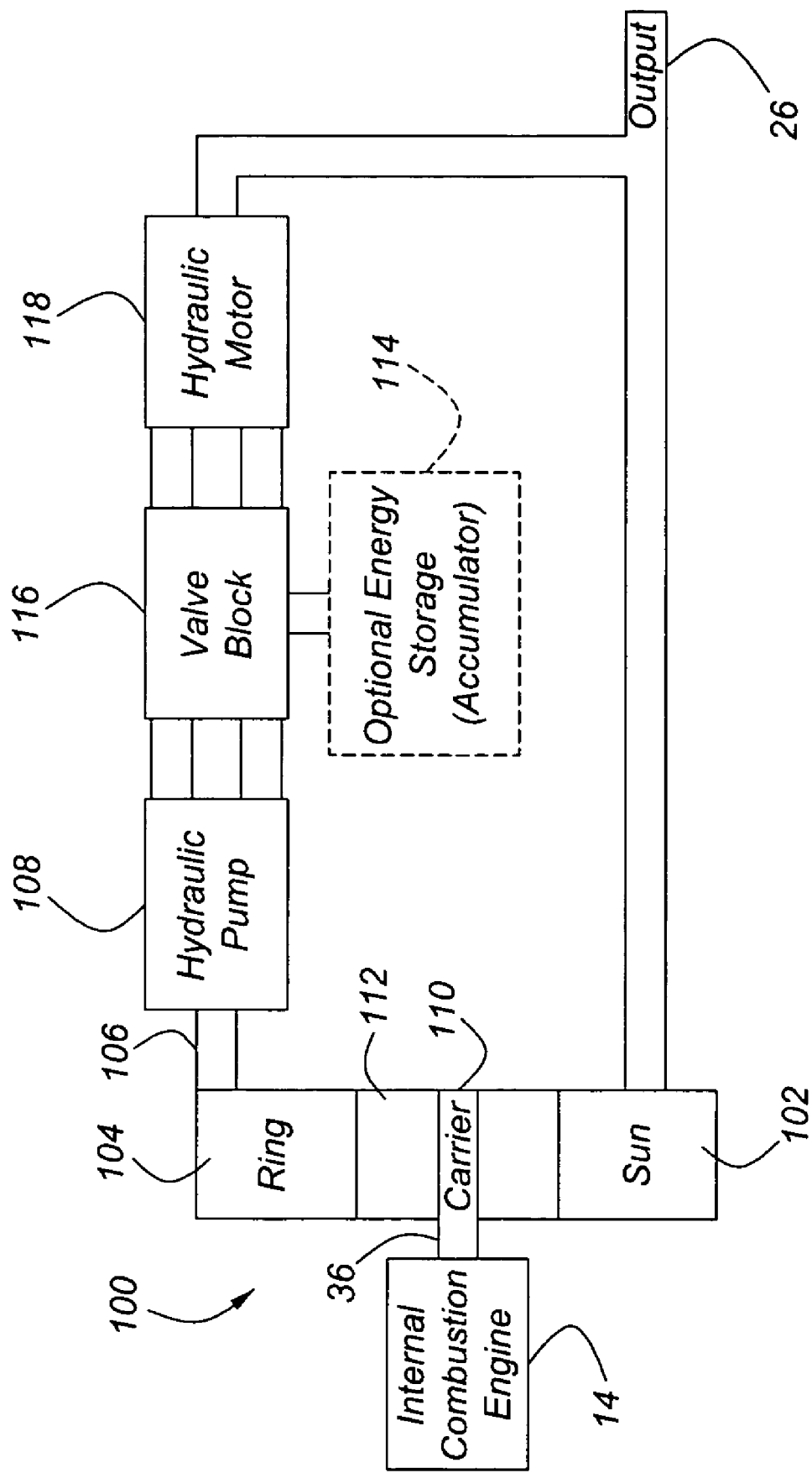
FIG. 6 is a schematic diagram of a transmission whose hydraulic components are coupled to the transmission output.

FIG. 6 is a schematic diagram of another hydrostatic transmission, which may be substituted for the IVT 14. A planetary gearset 100 includes a sun gear 102, which is driveably connected to the output 26; a ring gear 104, which is driveably connected to the shaft 106 of a fluid pump 108, preferably a hydraulic pump; a carrier 110, connected to the input 36; and planet pinions 112 meshing with the sun gear and ring gear. An energy storage device 114 is a hydraulic accumulator, which stores fluid under pressure. The accumulator 114 communicates through a valve block 116 alternately with the hydraulic pump 108 and a hydraulic motor 118, which is driven by pressurized fluid from the pump, the accumulator, or pump and accumulator combined. The motor 118 is driveably connected to the drive wheel 74 through the transmission output 26.

In operation, when the speed of carrier 36 is less than the speed of the ring gear 10, output 26 is driven in a reverse direction. When the speed of carrier 36 is equal to the speed of the ring gear 104, output 26 is stopped. When the speed of carrier 36 is greater than the speed of the ring gear 104, output 26 is overdriven in a forward direction. A controller (not shown) controls the speed of the ring gear 104 in accordance with the state of valves in the valve body 116, the speed and displacement of the motor 118 and pump 108, and pressure in the accumulator 114. The speed and torque ratios are kinematically determinate.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A powertrain for transmitting power to a drive wheel of a motor vehicle, comprising:
    a power source including a reversible electric machine having a slow transient response;
    a first transmission including an input driveably connected to the power source, a first output, and a mechanism for producing a stepless variable range of ratios of a speed of the power source and a speed of the first output;
    an epicyclic transmission including a second input driveably connected to the power source, a third input driveably connected to the first output, and a second output driveably connected to the drive wheel, for producing a range of speed of the drive wheel that varies from negative to positive and includes zero.

2. The powertrain of claim 1 further comprising:
    a clutch located in a drive path between the power source and the second input for alternately releasing and driveably connecting the power source and the second input.

3. The powertrain of claim 1, wherein the epicyclic transmission further includes:
    a sun gear driveably connected to the first output;
    a pinion carrier driveably connected to the power source;
    a ring gear driveably connected to the drive wheel; and
    planet pinions supported for rotation on the carrier and driveably engaged with the sun gear and the ring gear.

4. The powertrain of claim 1, wherein the reversible electric machine is an electric motor/generator.

5. The powertrain of claim 1, wherein the power source further comprises an internal combustion engine.

6. The powertrain of claim 1, wherein the power source comprises:
    an internal combustion engine; and
    an electric motor/generator.

7. The powertrain of claim 1, wherein the power source further comprises:
    an internal combustion engine; and
    a clutch for releasably driveably connecting the engine and the reversible electric machine.

8. The powertrain of claim 1, further comprising:
    a first sprocket wheel secured to the first output;
    a second sprocket wheel secured to the third input; and
    a drive chain driveably engaged with the first and second sprocket wheels.

9. The powertrain of claim 1, wherein the first transmission comprises:
    an input disc driveably connected to the power source, supported for rotation about an axis, including a first engagement surface;
    an output disc supported for rotation about an axis including a second engagement surface facing the first engagement surface; and
    a roller driveably engaged at variable positions with the first and second engagement surfaces, said engagement producing a stepless variable range of ratios of a speed of the output disc and a speed of the input disc.

10. The powertrain of claim 1, wherein the power source has a transient torque response that is equal to or greater than 150 Ms.

11. A powertrain for transmitting power from a power source to an output, comprising:
    a power source including reversible electric machine having a slow transient response;
    a traction drive transmission including an input disc driveably connected to the power source, an output disc, and a drive element driveably engaged with the input disc and output disc at variable positions on the discs for producing a stepless range of ratios of a speed of the input disc and a speed of the output disc;
    an epicyclic transmission including a sun gear driveably connected to the output disc, a pinion carrier driveably connected to the power source, a ring gear driveably connected to the output, and planet pinions supported for rotation on the carrier and driveably engaged with the sun gear and the ring gear, for producing a stepless range of ratios of a speed of the output and a speed of the power source, the speed ratio range varying from negative ratios to positive ratios including a zero ratio.

12. The powertrain of claim 11 wherein the number of speed ratios produced by the powertrain is infinite, and the output is alternately underdriven and overdriven relative to the speed of the power source.

13. The powertrain of claim 11 further comprising:
    a clutch located in a drive path between the power source and the planet carrier, for alternately releasing and driveably connecting the power source and the planet carrier.

14. The powertrain of claim 11 further comprising:
    a layshaft gearset including a pinion driveably connected to the power source, and a gear in meshing engagement with the pinion and driveably connected to the planet carrier.

15. The powertrain of claim 11, further comprising:
    a first sprocket wheel secured to the output disc;
    a second sprocket wheel secured to the sun gear; and
    a drive chain driveably engaged with the first sprocket wheel and second sprocket wheel.

16. The powertrain of claim 11, wherein the power source has a transient torque response that is equal to or greater than 150 Ms.

17. A powertrain for a motor vehicle comprising:
    an electric motor/generator having a slow transient response and including an output; and
    an infinitely variable transmission driveably connected to the output of the electric motor/generator and including a second output, the infinitely variable transmission producing a range of ratios of a speed of the output of the electric motor/generator and a speed of the second output that varies from negative to positive and includes zero.

18. A method for operating a powertrain that includes a power source having a slow transient response and an output the method comprising the steps of:
    driveably connecting the power source to an input of a first transmission capable of producing a stepless variable range of ratios of a speed or the power source and a speed or an output of the first transmission;
    driveably connecting the power source to a first input of an epicyclic transmission that includes the output;
    driveably connecting the output of the first transmission to a second input of the epicyclic transmission;

controlling a speed of the output of the first transmission relative to a speed of the power source such that the powertrain operates in a geared-neutral condition with the speed of its output being zero when the speed of the power source is not zero.

19. The method of claim 18 further comprising:
controlling the speed of the output of the first transmission relative to the speed of the power source such that the output is overdriven relative to the speed of the power source.

20. The method of claim 18 further comprising:
controlling the speed of the output of the first transmission relative to the speed of the power source such that the output rotates in an opposite direction from the direction of rotation of the power source.

21. The method of claim 18 further comprising:
controlling the speed of the output of the first transmission relative to the speed of the power source such that the output is underdriven relative to the speed of the power source.

22. The method of claim 18 further comprising:
controlling the speed of the output of the first transmission relative to the speed of the power source such that the output is alternately overdriven and underdriven relative to the speed of the power source.

23. A method for operating a powertrain in response to a command for a change in the magnitude of power transmitted to a vehicle wheel, the method comprising the steps of:

providing a reversible machine and a second power source to produce output power, said machine and second power source having a slow transient response;
transmitting the power output by the reversible machine and second power source to a vehicle drive wheel through an IVT; and
using the reversible machine to produce a portion of the magnitude of commanded wheel power during a period in which the magnitude of output power produced by the second power source is increasing.

24. A method for operating a powertrain in response to a command for a change in the magnitude of power transmitted to a vehicle wheel, the method comprising the steps of:
(a) providing a reversible machine and a second power source having a slow transient response to produce output power;
(b) providing an energy storage device operatively connected to the reversible machine; and
(c) transmitting energy to the energy storage device from the reversible machine during a period in which the magnitude of output power produced by the second power source is decreasing.

25. A method of claim 24 further comprising commanding a decrease in the magnitude power transmitted to a vehicle wheel from the second power source before performing step (c).

* * * * *